(No Model.)
V. A. STUMPH.
ADJUSTABLE UMBRELLA CARRIER.
No. 558,914.  Patented Apr. 21, 1896.
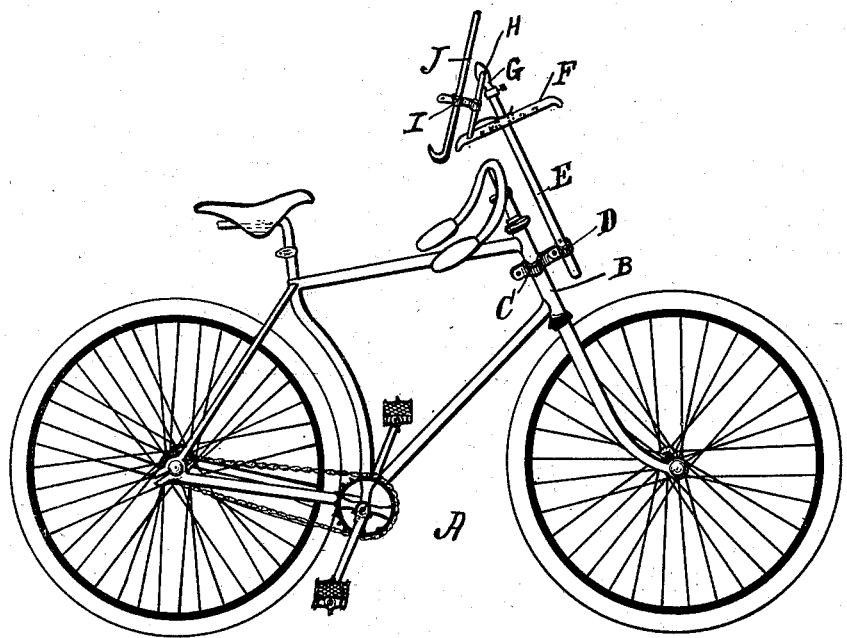
Fig. 1.
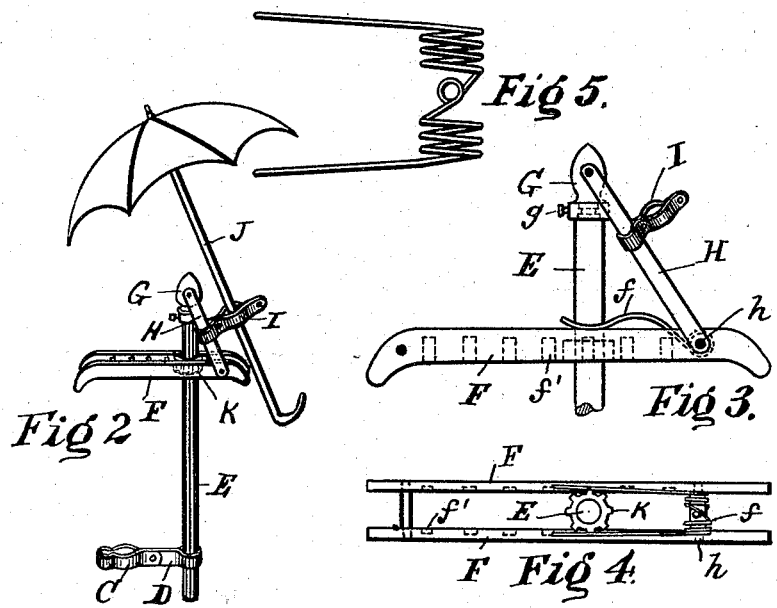
Witnesses:
M. McDonald
Charles Marien
Inventor:
Valentine A. Stumph
By Thurman & Silvius
Attorneys.

UNITED STATES PATENT OFFICE.

VALENTINE A. STUMPH, OF INDIANAPOLIS, INDIANA.

ADJUSTABLE UMBRELLA-CARRIER.

SPECIFICATION forming part of Letters Patent No. 558,914, dated April 21, 1896.

Application filed November 4, 1895. Serial No. 567,818. (No model.)

*To all whom it may concern:*

Be it known that I, VALENTINE A. STUMPH, a citizen of the United States, residing at Indianapolis, in the county of Marion and State of Indiana, have invented certain new and useful Improvements in Adjustable Umbrella-Carriers; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to devices which provide for the adjustability of an umbrella carried on a bicycle or other vehicle; and it consists of a swiveling umbrella-carrier and positive locking devices by which an umbrella is supported in any position in which it may be desired to shield a person from sun or rain, as will be more fully described hereinafter.

The object of my invention is to provide a means for this purpose which shall not be liable to become disarranged and which is readily adjustable by the use of one hand while the other may be necessary to use in guiding the bicycle.

A further object is to so construct a holder that the adjustment is universal and adaptable to all conditions of service. With these objects in view I have constructed my carrier of few parts, of simple design, which may be cheaply manufactured and is economical and durable in use.

Referring to the drawings, Figure 1 represents a side view of a bicycle embodying my invention. Fig. 2 is a side elevation of my invention detached from a vehicle. Fig. 3 is an enlarged detailed view of part of my device. Fig. 4 is a plan view of part of Fig. 3, and Fig. 5 is the spring used to prevent upward vibrations.

In the drawings, A is a bicycle; B, the forward part of the frame or head to which I attach my carrier, comprising a clamp C, having the connected clamp D, which holds the standard E, to which is permanently attached near its upper end a wheel K, having teeth on its periphery. At the top of the standard E is a cap G, having a small screw $g$ entering it from one side, which, passing through to a hole in the center of the cap, enters a short distance into an annular groove in the upper portion of the standard. This screw prevents the cap from coming off the standard, yet permits it to swivel or rotate around its top. Attached to the cap G by a pivot connection is an angle-brace or suspension-link, H, which is connected likewise pivotally at its lower end by the pin $h$, fixed on the link, to a pair of cross-arms F, having in their lower inner surfaces a series of notches $f'$, which correspond to and engage with the teeth of the small wheel K, attached to the standard, the closed upper ends of the notches resting upon the top edge of the wheel. These cross-arms may be raised at one end, but are held down normally on the toothed wheel by the action of the spring $f$, which is fastened at its center to and coiled around the pin $h$, while its ends bear downward on the arms. To the link H is attached a double-ended clamp I, which, while clamping to the link, at the same time clamps and supports the handle J of an umbrella or canopy.

In practical use, the standard E being supported as described and an umbrella-handle secured in the clamp I, the umbrella is readily adjusted to any angle or position by simply with one hand raising the free end of the cross-arms or racks F until the notches on the lower inner surfaces are disengaged from the teeth of the small wheel, when the cross-arms are used as a lever to rotate them around the standard, and may also be moved longitudinally in either direction to adjust the angularity of the umbrella-handle, as may be desired, after which they are again allowed to drop until the teeth and notches are again engaged, which will secure, by aid of the spring $f$, the devices and umbrella in the position intended. As will be seen, this arrangement is free of complication and is of great advantage because of its being adjustable instantaneously and without requiring the use of both hands of the operator. The several parts are preferably made of metal, but in some cases other material may be used.

Having described my invention, what I claim, and desire to secure by Letters Patent of the United States, is—

In an adjustable umbrella-carrier for bicycles, the combination with the frame of the vehicle, of a clamp attached thereto; the standard E supported by said clamp; the swiveled cap G connected to top of said standard; the suspension-link H or angle-brace attached to said swiveled cap and carrying the clamp I; the pair of cross-arms F having at their lower inner faces depressions or rack-teeth $f'$, said cross-arms being pivoted at one end and supported by the said suspension-link; the spring attached to the pin of said pivot arranged for depressing said cross-arms; the toothed wheel K secured to said standard, the teeth of which wheel engage with the rack-teeth or recesses $f'$ and support said cross-arms, substantially as shown and described.

In testimony whereof I affix my signature in presence of two witnesses.

VALENTINE A. STUMPH.

Witnesses:
EDWIN EATON,
JNO. S. THURMAN.